Dec. 13, 1932.                L. W. ROSENTHAL                1,891,059
                       APPARATUS FOR TOY ELECTRIC RAILWAYS
                              Filed Jan. 21, 1931
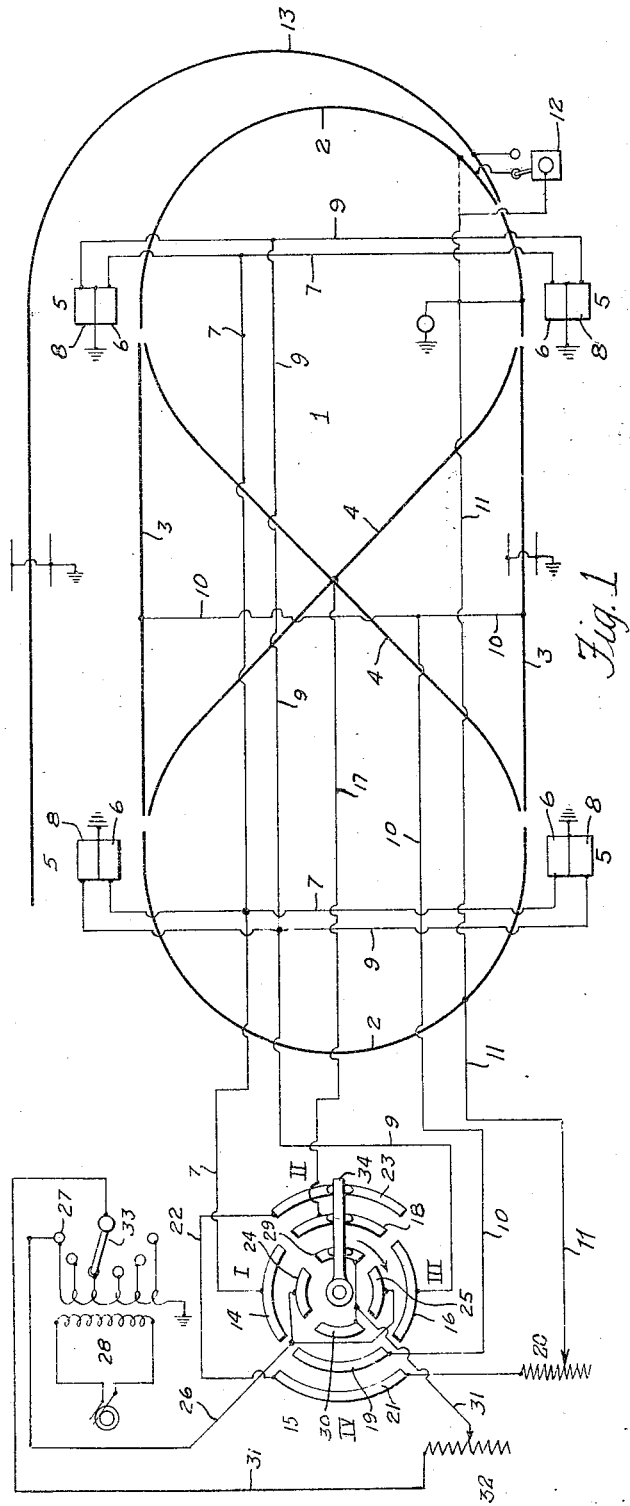
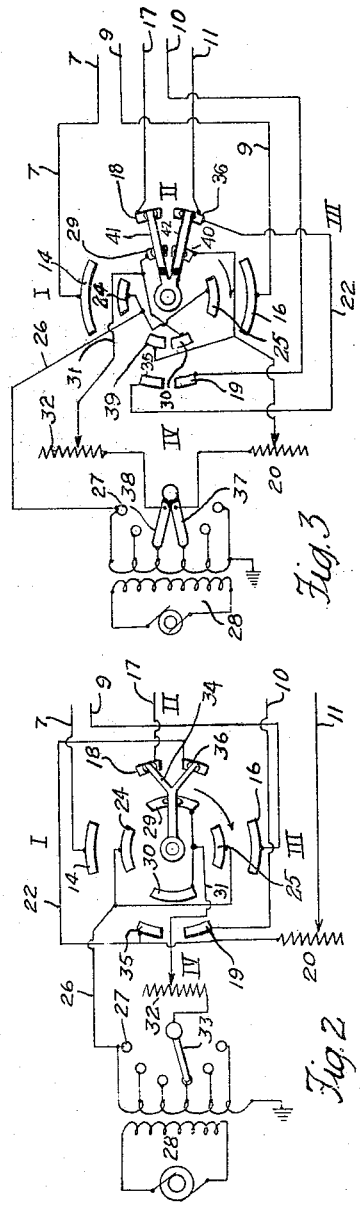
INVENTOR Patented Dec. 13, 1932

1,891,059

UNITED STATES PATENT OFFICE

LEON W. ROSENTHAL, OF NEW YORK, N. Y.

APPARATUS FOR TOY ELECTRIC RAILWAYS

Application filed January 21, 1931. Serial No. 510,192.

This invention relates to toy electric railways and more particularly to improvements in the apparatus described and claimed in my copending application Serial No. 494,535, filed November 10, 1930.

In the apparatus therein disclosed it is arranged that the common portions or sections of track shall be constantly energized, while only one or the other or both of the indigenous sections are deenergized, as the case may be, in the operation of said apparatus.

It has been found desirable, however, to deenergize or disconnect all of the sections of track from the power source just before connecting the solenoids of the track switch operating mechanisms, in order that all the available current from the electrical switch may be supplied to said solenoids to assure the operation of the track switches and also to stop a train or trains anywhere on said track in order to still further minimize possible derailment at a track switch.

It is therefore an object to provide an electrical switch which, in addition to disconnecting the proper indigenous sections, will also disconnect the common portions or sections of track from the power source before it connects the solenoids to said source. With all the current thus available from the electrical switch at the disposal of the solenoids, it is possible to effectively energize all of the solenoids simultaneously.

The above and other improvements are illustrated in the accompanying drawing, wherein:

Fig. 1 is substantially that of Fig. 1 of my aforesaid copending application embodying said improvements; and Figs. 2 and 3 show modified forms of electrical switches, and changes in power connections.

As in Fig. 1 of said copending application, Fig. 1 shows in skeleton form a track construction 1 comprising an elliptical track or circuit of transit and a "figure 8" loop or circuit of transit. The elliptical track is composed of sections 2, 2 and 3, 3 while the loop circuit is composed of sections 2, 2 and 4, 4; in other words, sections 2, 2 are common to both circuits of transit while sections 3, 3 are indigenous to the elliptical track or one circuit of transit, while the crossover sections 4, 4 are indigenous to the loop track or the other circuit of transit.

The said trackway is provided with the same electromagnetic or solenoid-operated track switching mechanism as shown and described in said copending application, and the said mechanism in each instance is represented more or less symbolically by the double solenoid 5, 5. All the corresponding coils of the said solenoids are connected to each other, the coils 6, 6 by a common conductor 7, and the coils 8, 8 by common conductor 9. The indigenous sections 3, 3 are connected to each other by common conductor 10, and the indigenous sections 4, 4 are also connected to each other in this instance, for example, in the manner indicated. The common portions or sections of track 2, 2 are connected to each other by common conductor 11 either directly or through an electrical switch 12 which is operatively associated with a track switch leading to a side track 13.

The common conductor 7 is connected to the segment 14 of the electrical switch 15, while conductor 9 is connected to the segment 16. A conductor 17 connects the sections 4, 4 to segment 18. The conductor 10 is connected to segment 19 and the conductor 11 is connected through a rheostat 20 to segment 21 which is connected by conductor 22 to segment 23. The segments 24 and 25 are respectively in line with segments 14 and 16, and said segments 24 and 25 are connected by conductor 26 to the high voltage tap 27 of the transformer 28. The segments 29 and 30 are respectively in line with segments 18 and 23 in the one case and segments 19 and 21 in the other, and the said segments 29 and 30 are connected by conductor 31 through rheostat 32 to the tapping arm 33 of the transformer. It will thus be seen that when the switch arm 34 bridges segments 14—24, current is supplied from the high voltage tap to the coils 6, 6, and when the switch arm bridges segments 16—25, the coils 8, 8 are connected to said high voltage tap. On the other hand, when the switch arm bridges segments 29—18—23, sections 4, 4 are connected to the rheostat 32 and the common curved sections 2, 2 are connected to the rheostat 20 which is in series with said rheostat 32. For convenience in reference, when the switch arm bridges the segments 14—24, the same will be referred hereafter as position I; when said arm bridges segments 23—18—29, position II; segments 16—25, position III; segments 21—19—30, position IV. When the arm is in position I, the coils 6, 6 are connected to the high voltage tap, while the rest of the track and other coils are disconnected from the power source. When the arm is moved from position I to position II, the coils 6, 6 are disconnected from the source, and sections 4, 4 and 2, 2 are connected. When the arm is moved from position II to position III, sections 4, 4 and 2, 2 are disconnected, and coils 8, 8 connected. When said arm is moved from position III to position IV, coils 8, 8 are disconnected and sections 3, 3 and 2, 2 connected. The rotation of the arm is unidirectional and in the direction indicated, namely, clockwise. The arm for each changeover is moved through a half circle and is brought to rest in each instance in position II or IV as the case may be. Thus, in order to change over from the figure 8 loop circuit, as the track is shown to be, to the elliptical or outer circuit, the arm is moved in a clockwise direction out of position II, into position III and still continuing the movement into position IV where the arm is then left. In this operation, the sections 4, 4 and 2, 2 are disconnected, solenoid coils 8, 8 are then energized to operate all the track switches, the coils 8, 8 are then disconnected and sections 3, 3 and 2, 2 connected. The electrical switch may be provided with means for preventing reverse rotation, such as shown in my said copending application, and may embody also the other instrumentalities therein shown for preventing inadvertent or improper operation as therein more fully described.

In Fig. 2 there is shown a slightly modified form of electrical switch. Here the segments 35 and 36 corresponding to segments 21 and 23 respectively are placed in the same ring as segments 14, 18, 16, 19, and the switch arm is forked. Otherwise the circuit connections thereto and the operation thereof is the same as the switch shown in Fig. 1.

In Fig. 3 the transformer is provided with two tapping arms 37 and 38 respectively, insulated from each other, but movable as a unit. The rheostat 20, instead of being connected in series with the rheostat 32 as in the previous instances, is connected to the lower voltage tapping arm 37, while rheostat 32 is connected to the higher voltage tapping arm 38. Segments 30 and 29 respectively of Fig. 2 are split into two segments each, adding the ring segments 39 and 40 respectively in line with segments 35 and 36 respectively, while segments 29 and 30 are in line with segments 18 and 19 respectively. There is also provided a two arm switch arm, the arms 41 and 42 of which are insulated from each other. The operation and circuit connections of this electrical switch are the same as those preceding, except for the few minor changes in segment distribution and in the internal wiring.

While the invention herein has been illustrated and described with respect to the operation of track switches, the same may be employed in connection with other track or way devices, such as semaphores, gates, etc., which are power operated.

Having described my invention, what I claim is:

1. In combination, a toy electric railway, a stationary power-operated track or way device to control said track, a power source, and means for disconnecting the entire track from and connecting the power device to said source.

2. In combination, a toy electric railway, a stationary power-operated track or way device to control said track, a power source, and a switch operable to disconnect the entire track from and connect the power device to said source.

3. In combination, a toy electric railway, a stationary power-operated track or way device to control said track, a power source, a switch, electrical connections between said source and switch, and electrical connections between said switch, the power device and the track, said switch including means operable to disconnect the entire track from and connect the power device to said source.

4. In combination, a toy electric railway, a stationary power-operated track or way device to control said track, a power source, a switch, electrical connections between said source and said switch, and electrical connections between said switch, the power device and the track, said switch having a single manual switch element operable to disconnect the entire track from and connect the power device to said source.

5. In a toy electric railway, a plurality of insulated third rails, a power source, a track switch, electromagnetic means for operating said track switch, an electrical switch, electrical connections between said source and said electrical switch, electrical connections between said electrical switch, the third rails and the electromagnetic means, and a single manual element operable to disconnect all of said third rails from and connect said electromagnetic means to said source.

6. In a toy electric railway, a track made up of interconnecting paths of transit having a portion or portions of track in common, a power source, electrical means for changing over from one path of transit to another, and means operable to disconnect the common portions of track from and connect the electrical means to said source.

7. In a toy electric railway, a track made up of interconnecting paths of transit having a portion or portions of track in common, track switches in said paths operable to effect a change-over from one path of transit to another, electrical means for operating said track switches to effect such change-over, a power source, and an electrical switch operable to disconnect said common portions of track from and connect said electrical means to said source.

8. In a toy electric railway, a track made up of two individually continuous circuits of transit having a portion or portions of track in common, track switches in said circuits operative to effect a change-over from one circuit of transit to the other, electromagnetic means for operating said track switches, a power source, and a single means operable to disconnect said common portions of track from and connect said electromagnetic means to said source.

9. In a toy electric railway, a track made up of interconnecting paths of transit having a portion or portions of track in common and a section or sections of track indigenous to each path, track switches in said paths operative to effect a change-over from one path of transit to another, and electrical means to effect this operation and control the common portions and indigenous sections of track accordingly, as and for the purpose described.

10. In a toy electric railway, a track made up of two individually continuous circuits of transit having a portion or portions of track in common and a section or sections of track indigenous to each circuit, and electrical means for changing over from one circuit of transit to the other including means for controlling said common portions and indigenous sections of track accordingly, as and for the purpose described.

11. In a toy electric railway, a track made up of two individually continuous circuits of transit having a portion or portions of track in common and a section or sections of track indigenous to each circuit, and means including a single manual control for effecting a change-over from one circuit of transit to the other and controlling the common portions and indigenous sections of track accordingly, as and for the purpose described.

12. In a toy electric railway, a track made up of two individually continuous circuits of transit having a portion or portions of track in common and a section or sections of track indigenous to each circuit, track switches in said circuits operable to effect a change-over from one circuit of transit to the other, electromagnetic means for operating said track switches, a power source, an electrical switch, electrical connections between said source and said electrical switch, and electrical connections between said electrical switch and said common and indigenous sections of track and the electromagnetic means, said electrical switch being operable to disconnect all of said track sections from and connect the electromagnetic means to said source.

In testimony whereof I affix my signature.
LEON W. ROSENTHAL.